Oct. 3, 1967  R. W. PETERS  3,345,002
ARMATURE WINDING MACHINE
Filed Oct. 24, 1965  2 Sheets-Sheet 2
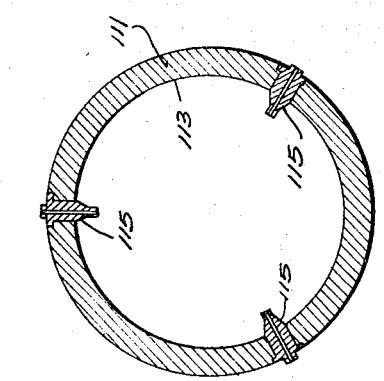
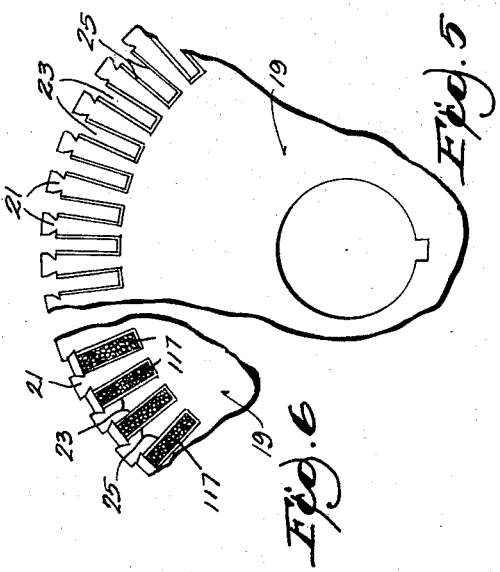
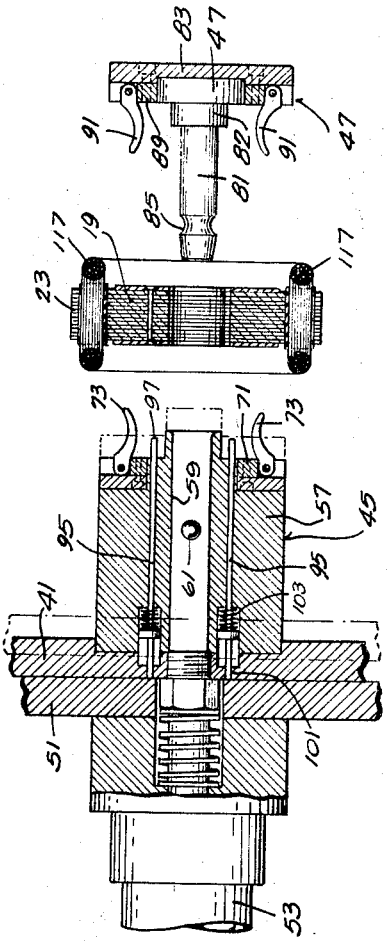
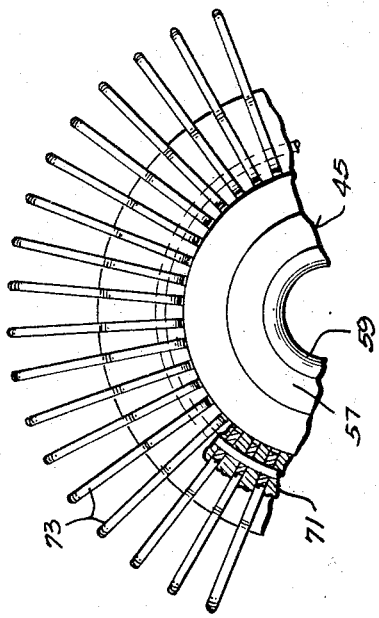
INVENTOR.
ROBERT W. PETERS
BY
Wheeler, Wheeler & Wheeler
ATTORNEYS

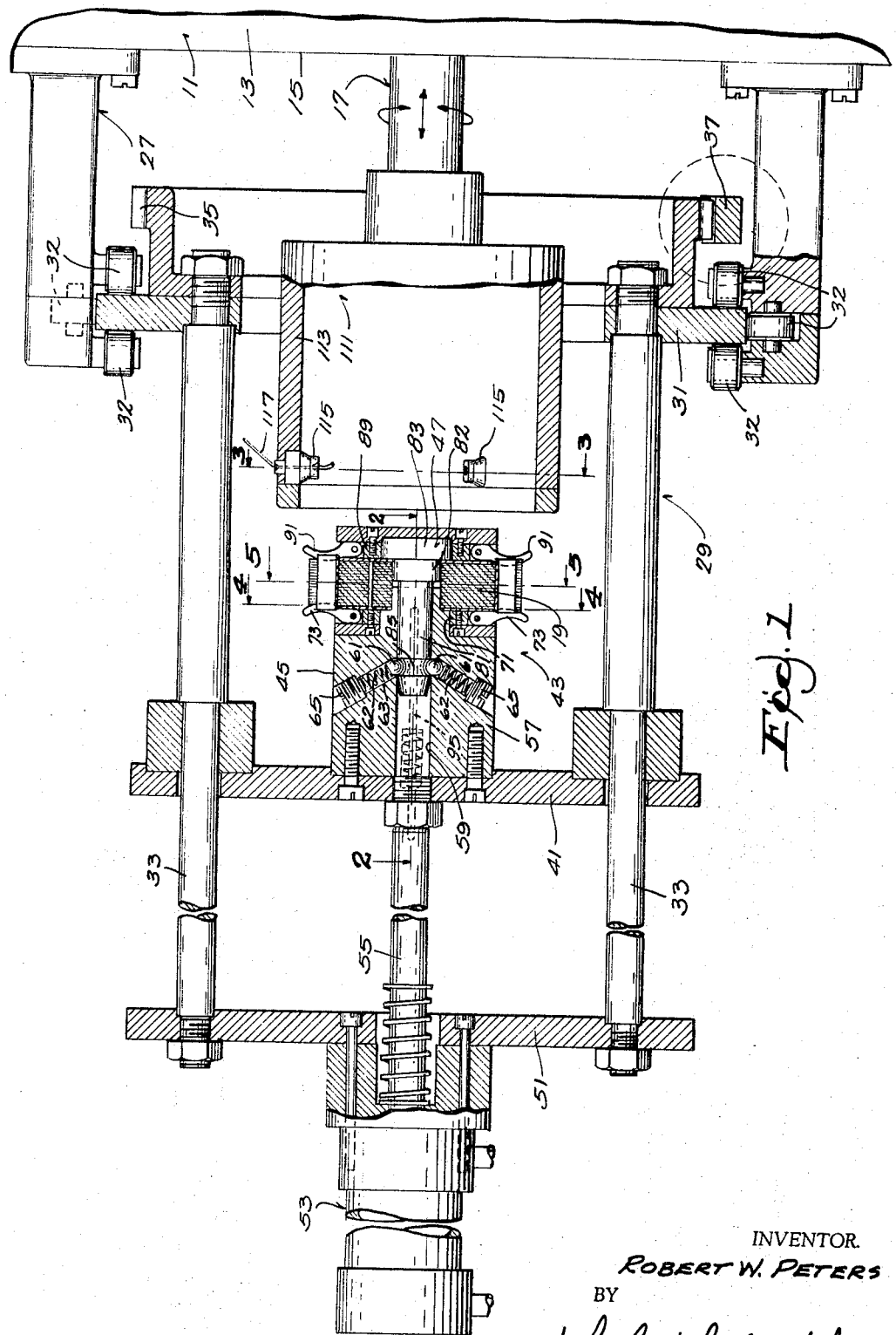

United States Patent Office 3,345,002
Patented Oct. 3, 1967

3,345,002
ARMATURE WINDING MACHINE
Robert W. Peters, Menomonee Falls, Wis., assignor to Henry J. Gorski, Milwaukee, Wis.
Filed Oct. 24, 1965, Ser. No. 504,622
4 Claims. (Cl. 242—13)

The invention relates generally to coil winding machines. More particularly, the invention relates to winding machines having a shuttle which is adapted to support a winding head and which is reciprocable and oscillatable relative to the unit or piece being wound.

A principal object of the invention is to provide apparatus for winding a rotor or armature by means of a winding machine having a reciprocably and oscillatably mounted shuttle. The invention resides, in part, in the construction of the winding head and in the arrangement for supporting the rotor to be wound relative to the winding head. More particularly, the invention resides in the provision of a winding head which is generally of cylindrical shape having an outer open end and having one or more radially inwardly projecting needles adapted to travel in the slots of the rotor to be wound. The invention also resides in the means or arrangement for cantilevered mounting of the rotor to be wound, such that the cylindrical winding head can oscillate and reciprocate in at least partially telescopic relation to the rotor. In addition, the rotor mounting means is arranged to selectively afford indexing of the rotor relative to the head.

Other objects, advantages, and features of the invention will become known by reference to the following description and accompanying drawings in which:

FIGURE 1 is a partially sectioned elevational view of the apparatus embodying various of the features of the invention;

FIGURE 2 is a partially sectioned, exploded view of a portion of the tooling for supporting the rotor to be wound, which view is taken generally along line 2—2 of FIGURE 1;

FIGURE 3 is a sectional view taken along line 3—3 of FIGURE 1;

FIGURE 4 is an enlarged and partially sectional fragmentary view taken generally along line 4—4 of FIGURE 1;

FIGURE 5 is an enlarged fragmentary view taken along line 5—5 prior to the winding operation; and FIGURE 6 is a fragmentary view showing a portion of the rotor after winding.

The rotor winding apparatus shown in FIGURE 1 generally includes a machine 11 of the type shown generally in the Gorski et al. Patent No. 3,052,418, which machine includes a frame 13 supporting a mounting surface or plate 15. The machine 11 also supports a shuttle 17 which is carried for both oscillatory and reciprocating movement by means such as set forth in the Gorski et al. Patent No. 3,052,418.

The invention resides, in part, in adaptation of the Gorski et al. machine for the winding of rotors 19, such as is shown in FIGURES 5 and 6, and which have a circumferential series of radially outwardly extending fingers or projections 21 which define therebetween a like series of radially outwardly open slots 23 into which the coils are laid. Suitable insulation 25 is provided in the slots 23.

In accordance with the invention, there is fixed on the mounting plate a sub-frame 27 carrying an indexible support 29 which includes an annular ring member 31 which is supported for rotation about the axis of shuttle oscillation by a plurality of groups of rollers 32 mounted on the sub-frame 27. The support 29 also includes two ore more support rods 33 extending from the ring member 31 in the direction of reciprocation of the shuttle 17 and a ring gear member 35 mounted in the ring member 31 and adapted to engage with a rack 37. Suitable means, not shown, can be employed for linearly displacing the rack 37 to effect rotation or indexing of the support 29. Carried for reciprocal movement on the support rods 33 is another mounting plate 41 which constitutes one component of a means for supporting tooling 43 for holding the rotor 19 to be wound. This tooling 43 comprises a female member 45 fixed to the mounting plate 41 and a male member 47 which is releasably attachable to the female member 45 so as to confine the rotor 19 to be wound therebetween. As a consequence of the above briefly described arrangement, the rotor 19 can be removably supported in spaced relation to the mounting plate 15 of the machine 11 and can be indexed relative to the mounting plate 15 of the machine 11.

The mounting plate 41 and accompanying tooling 43 is movable along the support rods 33 between a winding position, shown in FIGURE 1, and a retracted position (shown diagrammatically in FIGURE 2) adjacent to a circular or ring plate 51 which connects the outer ends of the support rods 33. The mounting plate 41 and accompanying tooling 43 is displaced by suitable means in the form of a hydraulic ram 53 mounted on the ring and an actuating rod 55 connecting the ram 53 and mounting plate 41. In the retracted position, the male member 47 can be withdrawn from the female member 45 to afford unloading of the rotor 19.

The female member 45 comprises a main body 57 including a central aperture, socket, or bore 59 and one or more detent balls 61 mounted for resilient projection into the bore 59. While various arrangements can be employed, the balls 61 are resiliently mounted in radially extending sockets 62 by employment of respective coil springs 63 which are retained in position by set screws 65. Carried by the female member 45 adjacent the end of the main body remote from the plate 41 is a finger ring 71 including thereon a plurality of pivotally mounted fingers 73 which are alignable with the projection or lands 21 between the slots 23 in the rotor 19.

The male member 47 includes a flange 83 and a shank 81 which extends from the flange 83, which includes a portion 82 with a diameter dimensioned to receive and support the rotor 19, and which is insertable into the bore 59 in the female member 45. Included in the shank 81 is a groove 85 which cooperates with the detent balls 61 to releasably retain the male member 47 in assembled relation with the female member 45. Mounted adjacent to the flange 85 is a finger ring 89 pivotally supporting a plurality of fingers 91 which are alignable with the projections or lands 21 between the slots 23 in the rotor 19.

Means are provided for automatically releasing the male member 47 from the female member 45 incident to movement of the mounting plate 41 and accompanying tooling 43 to the retracted position. In this regard, there extends through the main body 57 of the female member 45, as shown best in FIGURE 2, one or more push rods 95 which include male member engaging extremities or ends 97 and ring plate engaging extremities or ends 101. The push rods 95 are normally biased by springs 103 so as to retract the male member engaging ends 97 into the main body 57 of the female member or socket.

In the winding position, the ring plate engaging ends 101 of the push rods 95 extend beyond the mounting plate 41. However, when the mounting plate 41 and accompanying tooling 43 are moved to the retracted position, the ends 101 of the push rods 95 engage the ring plate 51 (as shown in FIGURE 2) to effect displacement of the push rods 95 to the right as shown in FIGURE 2, thereby displacing the male member 47 to the right and releasing the engagement of the detent balls 61 with the groove 85. Thereafter, the operator may easily remove the male member 47 from the female member 45 with the rotor 19 carried thereon. Subsequently, the rotor 19 can be slipped off the shank 81 of the male member 47.

In loading of the apparatus, the rotor 19 is slipped over the shank 81 of the male member 47 and the shank 81 is then inserted into the bore 59 of the female member 45 to engage the detent balls 61 with the groove 85, thereby releasably assembling the male and female members with the rotor 19 held therebetween.

Winding of the rotor 19 thus supported is accomplished by a winding head 111 which is mounted or supported by any suitable means on the shuttle 17 in order to afford reciprocating and oscillating head movement. The head 111 includes a ring or cylindrical part or member 113 having a diameter sufficient to afford telescopic movement of the ring part relative to the rotor 19 and to the radially outwardly extending tooling fingers 73 and 91. Carried on the inner surface of the ring part are one or more needles 115 which are adapted to travel in the radially outwardly open rotor slots 23 in order to lay wire 117 in the slots 23 during shuttle reciprocation. During shuttle oscillation, wire is laid from the needles 115 arcuately around the rotor radially outwardly of the inner ends of the slots 23 and around the radially outwardly extending tooling fingers 73 and 91. Wire is fed through the needles 115 from the outside of the head 111 and is supplied to the needles 115 by any suitable arrangement.

Thus in operation, when the rotor 19 is supported by the tooling 43, operation of the winding machine 11 causes the winding head 111 to reciprocate and oscillate relative to the rotor 19 so as to lay the desired windings in the rotor slots 23.

One or more windings may be simultaneously laid depending upon the number of needles 115 involved. When one winding is completed, the angular extent of the oscillatory movement can be changed to provide additional windings of different angular span or the rotor support 29 can be indexed relative to the winding head 111 to provide for angularly displaced windings of the same angular span as previously wound.

Various features of the invention are set forth in the following claims.

What is claimed is:
1. Apparatus for winding rotors comprising a frame, tooling for holding a rotor, said tooling comprising a male member including a shank and a flange, said shank having a portion with a diameter dimensioned to receive and support the rotor to be wound, and a female member having a socket for releasably receiving said shank, means for supporting said tooling on said frame, a winding head, and means on said frame for supporting said winding head and for reciprocating and oscillating said head relative to said tooling.

2. Apparatus for winding rotors comprising a frame, tooling for holding a rotor, said tooling comprising a male member including a shank and a flange, said shank having a portion with a diameter dimensioned for receiving and supporting the rotor to be wound, and a female member having a socket for releasably receiving said shank, means for supporting said tooling on said frame and for rotatably indexing said tooling relative to said frame, a winding head, and means for reciprocating and oscillating said head relative to said tooling.

3. Apparatus for winding rotors comprising a frame, tooling for holding a rotor, means for supporting said tooling on said frame, a winding head comprising a cylindrical part and at least one radially inwardly extending needle, and means on said frame for supporting said winding head and for reciprocating and oscillating said head relative to said tooling.

4. Apparatus for winding rotors comprising a frame, tooling for holding a rotor, said tooling comprising a male member including a shank and a flange, said shank having a portion with a diameter dimensioned for receiving and supporting the rotor to be wound, and a female member having a socket for releasably receiving said shank, means for supporting said tooling on said frame and for rotatably indexing said tooling relative to said frame, a winding head comprising a cylindrical part and at least one radially inwardly extending needle, and means supporting said winding head for reciprocating and oscillating said head relative to said tooling.

References Cited
UNITED STATES PATENTS

| | | | |
|---|---|---|---|
| 2,339,589 | 1/1944 | Stearns | 242—13 |
| 3,052,418 | 9/1962 | Gorski et al. | 242—1.1 |

FRANK J. COHEN, *Primary Examiner.*

B. S. TAYLOR, *Assistant Examiner.*